United States Patent
Ruttor

(10) Patent No.: US 6,805,025 B2
(45) Date of Patent: Oct. 19, 2004

(54) HARMONIC DRIVE AND INTERNAL GEARED WHEEL FOR A DRIVE OF THIS TYPE

(75) Inventor: Martin Ruttor, Ansbach (DE)

(73) Assignee: Oechsler AG, Ansbach (DE)

( * ) Notice: Subject to any disclaimer, the term of this patent is extended or adjusted under 35 U.S.C. 154(b) by 0 days.

(21) Appl. No.: 10/220,827
(22) PCT Filed: Feb. 22, 2001
(86) PCT No.: PCT/EP01/02025
§ 371 (c)(1),
(2), (4) Date: Oct. 24, 2002
(87) PCT Pub. No.: WO01/66974
PCT Pub. Date: Sep. 13, 2001

(65) Prior Publication Data
US 2003/0047025 A1 Mar. 13, 2003

(30) Foreign Application Priority Data
Mar. 4, 2000 (DE) .......................... 100 10 156

(51) Int. Cl.⁷ .............................................. F16H 33/00
(52) U.S. Cl. ............................ 74/640; 74/441; 475/161
(58) Field of Search ..................... 74/640, 441, 409, 74/411, 437, 439; 475/161

(56) References Cited

U.S. PATENT DOCUMENTS

| 2,966,808 | A | | 1/1961 | Grudin | |
|---|---|---|---|---|---|
| 3,088,333 | A | * | 5/1963 | Musser | 74/640 |
| 3,902,670 | A | * | 9/1975 | Koller et al. | 239/227 |
| 4,625,582 | A | * | 12/1986 | Kiryu | 74/640 |
| 6,109,136 | A | * | 8/2000 | Dold | 74/640 |
| 6,202,509 | B1 | * | 3/2001 | Dold | 74/640 |
| 6,220,115 | B1 | * | 4/2001 | Hirn et al. | 74/640 |
| 6,454,532 | B1 | * | 9/2002 | Gmirya | 416/87 |

FOREIGN PATENT DOCUMENTS

EP  0974 773 A  1/2000

\* cited by examiner

Primary Examiner—Roger Pang
Assistant Examiner—David D. Le
(74) Attorney, Agent, or Firm—Horst M. Kasper

(57) ABSTRACT

The refinement of such harmonic drives according to German Patent 1 98 33 290 C1=European Patent Application 0 974 773 A concerns damping of the noise generation as a consequence of the revolving displacement of discrete tappets (instead of the rotating deformation of the closed hub of a spoked wheel) on the non-round wave generator. Since the feet of the individual—not guided in a cage, but rather connected to one another by a flexible ring band—tappets are no longer solid, but rather split, they are to be able to elastically bend so they may press continuously against the drive core of the wave generator. The peripheral connection of the neighboring tappets via the ring band, which is thin in comparison to their diameters, is to be laid out in such a way that a spring effect is achieved, using which the tappet—even in the course of instantaneous reduction in diameter as the drive core, which is oval in cross-section, rotates out of the angular region of its greatest diameter—is always kept radially pressing snugly against the non-round wave generator in order to, in this way, suppress a noise-generating radial rebound from a displacement position which is still radially lifted.

19 Claims, 1 Drawing Sheet

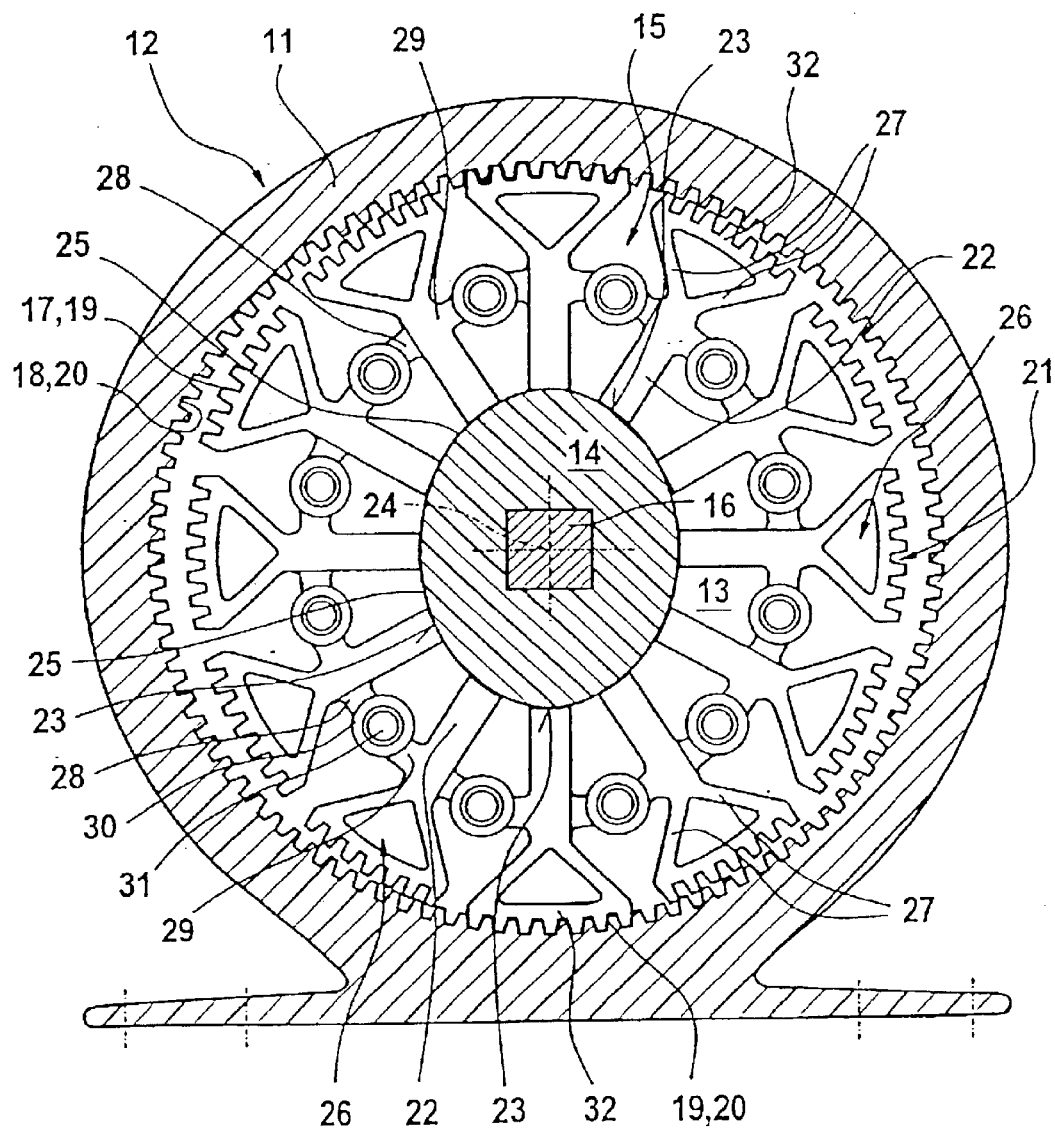

HARMONIC DRIVE AND INTERNAL GEARED WHEEL FOR A DRIVE OF THIS TYPE

This application is a 371 of 1 PCT/EP01/02025 filed Feb. 22, 2001.

The present invention relates to a harmonic drive and an internal geared wheel for such a drive according to the respective preambles of the main claims.

Such a harmonic drive having an internal geared wheel, comprising a link chain made of toothed segments which enclose an springy steel sleeve, in turn supported via bearing rollers on a cam, which is put in rotation via a planetary gear arrangement situated inside it, driven using a central shaft, is known from German Patent Specification 1 182 011.

The functionality of such a harmonic drive—also known as a wave drive or ring band drive—as a very strongly reducing, self-limiting system having a driven shaft coaxial to the drive shaft, is based on a rotating wave generator (namely the cam in this case) continuously radially deforming an internal geared wheel hoop (in this case the chain, whose chain links are toothed on their outer curves) and therefore the external peripheral surface of this wheel rim continually pressing locally outward against the hollow cylindrical internal peripheral surface of slightly greater circumference of a stationary, dimensionally stable bearing ring. As a consequence, the internal geared wheel itself or its wheel hoop, mounted thereon as a rotatable wheel rim, rolls in the bearing ring frictionally via friction surfaces or (as in this case) positively via teeth, the wheel and/or its hoop rotating slower than the drive core of the wave generator, which is driven by a motor, according to the difference in circumferences.

This rotational movement, which is greatly slowed in relation to the actuation, is preferably transmitted via the external teeth of the hoop, which is shaped like a wheel rim, to the internal teeth of a further external ring, the driven ring, which is concentric to the bearing ring but not stationary, a further reduction of the rotational velocity able to occur due to differing circumferences (number of teeth). The wave generator is typically driven via a low voltage DC motor, coaxially flanged on, which is high-speed and therefore available very cheaply, whose rotation is thus reduced into a much greater torque corresponding to a much slower rotational movement.

The refinement of such harmonic drives according to German Patent 1 98 33 290 C1=European Patent Application 0 974 773 A concerns damping of the noise generation as a consequence of the revolving displacement of discrete tappets (instead of the rotating deformation of the closed hub of a spoked wheel) on the non-round wave generator. Since the feet of the individual—not guided in a cage, but rather connected to one another by a flexible ring band—tappets are no longer solid, but rather split, they are able to elastically bend so they may press continuously against the drive core of the wave generator. The peripheral connection of the neighboring tappets via the ring band, which is thin in comparison to their diameters, is to be laid out in such a way that a spring effect is achieved, using which the tappet—even in the course of instantaneous reduction in diameter as the drive core, which is oval in cross-section, rotates out of the angular region of its greatest diameter—is always kept radially pressing snugly against the non-round wave generator in order to, in this way, suppress a noise-generating radial rebound from a displacement position which is still radially lifted.

In the embodiments known from German Utility Model 2 96 14 738 and described in more detail in the article "Genial einfach" by H. Hirn (KEM Antriebstechnik issue November/1996), the harmonic drive does not have a chain and planetary gear construction, which is noisy, subject to wear, and expensive because of the many individual parts to be assembled, but rather comprises very few plastic injection molded parts. As a wave generator, a non-round (for example triangular or preferably oval in axial cross-section) drive core is rotated concentrically in the hub of a radially deformable internal geared wheel. Dimensionally stable spokes between the hub, which is radially deformed by the drive core, and the hoop of this internal geared wheel, which is also radially deformable and is externally toothed, have the effect that the outer teeth of the hoop, corresponding to its revolving radial deformation, only engage over a limited curved segment, which rolls therein, with the inner teeth of the bearing ring. To reduce the heat-generating friction between the pairing of the plastic lateral surfaces, of the drive core on the one hand and of the internal geared wheel hub on the other hand, rotating relative to one another, a friction bearing in the form of a metal collar may be introduced, which also eccentrically deforms revolvingly under the influence of the eccentric drive core rotated therein (i.e., it does not have any support function for toothed chain links resting thereon according to the drive forming the species). This friction bearing, which is interposed in the plastic construction, distributes the relative rotation between the drive core and the internal geared wheel hub onto two stages and, merely due to the frictional behavior of plastic, which is generally more favorable than that of metal, also leads to reduction of the friction losses, i.e., the waste heat within this harmonic drive, which is compactly produced almost completely from plastic injection molded parts and is hermetically encapsulated. However, high demands are placed on the alternating stressability of the collar, which continuously deforms under load, and its installation in such a harmonic drive of small dimensions leads to a detectable elevation of the manufacturing costs. In addition, due to the high reduction ratio of such a harmonic drive, a heat buildup which is critical to its functioning may still occur, above all in the driving region.

In these known harmonic drives, which are compactly produced in plastic injection molding and to which high-speed and therefore cheaply available low voltage DC motors are typically connected in series, the internal geared wheel is therefore a one-piece injection molded part having dimensionally stable, spoke-like, radially oriented tappets between a radially deformable hub and the externally toothed hoop, also radially deformable, which requires a technologically demanding injection molding technique due to the material properties, which differ greatly in radial section. In this case, it has been shown to be economically disadvantageous, since it is expensive, if—for example to adjust to concretely occurring operating requirements by replacing internal geared wheels of different circumferences—differently dimensioned variants must be kept available.

The present invention is therefore based on the technical problem of maintaining the mechanical and application-oriented advantages of the previously known harmonic drives while refining them in such a way that their construction is simplified, in order to, above all, be able to be more flexible in regard to the implementation of the internal geared wheel through a more favorable implementation while reducing the production costs.

This object is achieved according to the present invention in that the harmonic drive according to the species and/or its internal geared wheel is designed using the features of the respective main claim. Accordingly, the idea of the toothed segments, from the chain construction forming the species, which has not yet received any practical significance, is inventively combined with the idea of the spokes from the injection molded implementation, which is also known, but has a very different construction, and which has been used in mechanical practice, in such a way that the internal geared wheel is assembled from a variable number of separately produced tappets having identical geometry, which are supported with the foot end of their shaft almost radially on the external lateral surface of the drive core and have opposing radially elastically compressible heads, only those of which lie in the extension of one of the larger radii of the wave generator, and which are therefore radially displaced somewhat outward from an imaginary circular segment, pressing snugly against the hollow cylindrical internal lateral surface of the external rings, which neighbor one another axially, (bearing ring and driven ring). The external teeth of the internal geared wheel may be implemented directly on the external lateral surface of the shaft heads, which neighbor one another at a distance; or the shaft heads are used as a support of a separate flexible band, which extends around the circumference over them, having external teeth. In the latter case, the flexible band may roll via the internal geared wheel, the internal geared wheel itself then does not need to rotate around the drive axle as well.

Approximately centrally and transversely, the shaft of each tappet has two short arms which end in connection profiles for articulated coupling to the peripherally neighboring arms of the neighboring tappets on both sides. Therefore, each of the tappets from which the internal geared wheel is assembled has the shape of a Western Roman cross in cross-section in relation to the drive axis, with a triangular expansion to the tappet head implemented above the vertical bar.

The internal geared wheel of a harmonic drive, which is subject to high mechanical stress, is therefore, according to the present invention, assembled in a pivotable and articulated way from individual radial tappets, which are identical to one another and essentially solid, each of which is equipped with an elastically radially compressible hollow head, using side connection profiles—preferably differing but completing one another complementarily—which are connectable to one another in pairs. The geometry of the tappets may be produced economically on a large scale by plastic injection molding a rigid, thermoplastic, low-density material, in a technologically non-critical manner and with a considerable degree of dimensional accuracy, so that an internal geared wheel which may be assembled from a variable number of tappets is also distinguished by low mass inertia. Each tappet, which may be mounted in its longitudinal direction, has good sliding friction and wear characteristics and is very dimensionally stable in relation to heat, particularly in the foot region, when the foot is approximately radially supported on the wave generator, due to the combination of materials.

Reference is made, in regard to further characteristics and additional refinements of the present invention, to the following description of a preferred exemplary embodiment of the achievement of the object according to the present invention and to the further claims as well as to both of our contemporary parallel applications having the same title, particularly in regard to the wave generator support.

The single figure of the present invention illustrates, approximately to scale and enlarged but restricted to the elements essential to its function, a front view toward the internal geared wheel, produced from multiple individual identical tappets, according to the present invention of a harmonic drive inside its stationary bearing ring.

The drawing shows an axial section through bearing ring 11, which is fixed to the housing, of a harmonic drive 12, directly in front of face end 13 of radially deformable internal geared wheel 15, externally toothed in this example, which is axially penetrated by coaxial, dimensionally stable, non-round drive core 14. A drive shaft 16, which is coaxial but rotates together with the internal geared wheel, engages in drive core 14, which is typically oval in cross-section as shown and is concentrically rotatable in relation to internal geared wheel 15; this drive shaft may be the directly extended motor shaft of a drive organ (not visible in the sectional illustration, but possibly positioned concentrically over the plane of the drawing as an electric or hydraulic motor). Internal geared wheel 15, which is deformed by drive core 14 so as to be non-round in cross-section, is rotationally connected to the dimensionally stable hollow cylindrical internal lateral surface 18 of stationary bearing ring 11 in the extension of the larger radii of drive core 14 along the curved segment of its external lateral surface 17, which is displaced sufficiently radially outward there, through friction or, as shown, via radial teeth 19/20. Internal geared wheel 15, including drive core 14, extends axially below the plane of the drawing into a further external ring, axially neighboring bearing ring 11 visible in the drawing, which is not arranged stationary, but is mounted by teeth 19 of internal geared wheel 15 so it also rotates as a coaxial driven ring of this strongly reducing drive 12.

This radially deformable internal geared wheel 15, which is axially long and radially wide, is assembled from a number of identical, individual tappets 21, which may be connected to one another into a circular ring so they lie next to one another and move together. Each of these tappets 21 comprises, above all, a cuboid shaft 22 extending approximately over the axial length of drive core 14, which is supported, along the generating axis and radially in relation to device axis 24, using its foot 23 on external lateral surface 25, which is non-round in cross-section, of drive core 14. Opposite the free face end of foot 23, each shaft 22 ends in a head 26, which is, above all, radially elastically compressible in relation to the shaft. The head essentially has the cross-sectional shape of a hollow cylindrical section, extending parallel to the axis over the length of drive core 14 and therefore over the depth of shaft 22 parallel to the axis, having flexible transitions at the ends of its sectored side walls 27 opposite to foot 23 of shaft 22. These are elastically spread somewhat peripherally when a curved wall 32 of head 26 connecting this radial pair of walls 27—27 on the face side is somewhat radially compressed (and therefore flattened) against bearing ring 11 due to pressure, so that teeth 19/20 therefore engage somewhat more reliably here. Therefore, in this exemplary embodiment a peripheral flexible band is not carried by internal geared wheel 15, but rather the spaced out sequence of curved walls 32 itself acts as an interrupted wheel hoop, which is equipped with corresponding segmented external teeth 19 and is connected so it rotates together with internal geared wheel 15.

The lateral support of tappets 21 in peripheral sequence against one another and therefore simultaneously their circular positioning and movable connection to assembled internal geared wheel 15 occurs using short arms 28–29, laterally molded on shaft 22, preferably in one piece, which each end in axially offset connection profiles 30, 31. If these profiles are rings oriented with their axes parallel, which therefore come to lie over one another in pairs, then they may be connected to one another easily in an articulated way by a pivot pin inserted through parallel to the axis and the initially loose interconnection of a large number of tappets 21, which are then linked to one another like a link chain, becomes internal geared wheel 15 of large axial length and large radial thickness, which is deformable within limits in the axial cross-sectional plane. Its circumference may vary to a certain degree through the number of tappets 21 to be connected to one another into internal geared wheel 15 to adjust to the diameter of internal lateral surface 18 of a selected bearing ring 11. It does not matter that the external curves of tappet head 23 do not always lie on one of the curves concentric to internal lateral surface 18, since head 26 is pressed radially into internal lateral surface 18 in the region of toothed engagement 19–20 while its curved wall 32 deforms and therefore always produces good locking form fit 19/20.

Even simpler, and therefore also more favorably automatable in manufacturing, is a directly pluggable snap-like connection, for example, between neighboring tappets 21 into internal geared wheel 15. For this purpose, each tappet 21 is equipped with an arm 28, which lies below or ends below the plane of the drawing, for example, and a further arm 29, which lies above or ends above the plane of the drawing, which extend over, for example, about half the length of tappet 21 parallel to device axis 24. One arm 28 is equipped on its free end with a pocket hole parallel to the axis as connection profile 30, other arm 29 is equipped with a pin parallel to the axis for engagement in each hole as connection profile 31. For assembly into internal geared wheel 15, tappets 21 only have to be inserted in sequence, with their pin parallel to axis 24, into the hole of tappet 21 already present (or vice versa) in order to form the link chain from tappets 21—21 and finally close it into chainring-shaped internal geared wheel 15.

What is claimed is:

1. A harmonic drive (12) having a drive core (14) of non-round cross-section rotating around its axis (24) for coaxial rolling with a surrounding, radially deformable sequence of curves in the shape of a wheel hoop which are connected to one another in an articulated way in a dimensionally stable bearing ring (11) of somewhat greater diameter, characterized in that an internal geared wheel (15) is assembled from individual, spoke-shaped, radially oriented tappets (21), whose tappet shafts (22) are equipped with feet (23), which are supported transverse to the axis (24) on the outside (25) of the drive core (14), with heads (26), which each have a curved wall (32), on the opposite side, and, approximately centrally between these elements, with connection profiles (30, 31), which project laterally in peripheral direction for mutual articulated connections of the tappets (21) to one another;

wherein the connection profiles (30, 31) of said tappet (21) are a hole parallel to the axis on one side and a pin parallel to the axis on the other side to engage in such said hole.

2. The harmonic drive according to claim 1, characterized in that it is produced from said neighboring individual tappets (21) which are connected to one another in an articulated way in a circular arc, whose respective shafts (22) are equipped with said connection profiles (30, 31), which project laterally in the peripheral direction, approximately centrally between their feet (23) and their heads (26), for mutual articulated connections to one another.

3. The harmonic drive according to claim 1, characterized in that the connection profiles (30, 31) on both sides of said tappet (21) are implemented, parallel to the rotational axis (24) and offset to one another, on free face ends of peripheral projecting arms (28, 29), which are short in relation to the radial length of the tappet (21), in the central region of the tappet (21).

4. The harmonic drive according to claim 1, wherein the connection profiles (30, 31) are implemented on two sides of each individual tappet (21), are disposed parallel to the rotational axis (24) and offset to one another, on the free face ends of peripheral projecting arms (28, 29), which peripheral projecting arms (28, 29) are short in relation to a radial length of the tappet (21), in a central region of the tappet (21).

5. The harmonic drive according to claim 1, characterized in that it is produced from said neighboring individual tappets (21) which are connected to one another in an articulated way in a circular arc, whose respective shafts (22) are equipped with said connection profiles (30, 31), which project laterally in the peripheral direction, approximately centrally between their feet (23) and their heads (26), for mutual articulated connections to one another, wherein the respective shaft (22) of the foot (23) facing the rotational axis (24) of the drive core (14) and of the internal geared wheel (15) is equipped on another end with said peripherally expanding head (26) which is elastically compressible radially in relation to the rotational axis (24), wherein the head (26) of each tappet (21) is laid out as a hollow body like a hollow cylindrical body section extending parallel to the axis, wherein side walls (27) of the head (26), which side walls expand peripherally from the shaft (22), are connected to one another on their face ends facing away from the rotational axis (24) by said curved wall (32), which forms a section of an elastically deformable external lateral surface (17) of the internal geared wheel (15), wherein the head (26) is furnished with radial teeth.

6. The harmonic drive according to claim 1, characterized in that the respective shaft (22) of the foot (23) facing the rotational axis (24) of the drive core (14) and of the internal geared wheel (15) is equipped on an other end with said peripherally expanding head (26) which is elastically compressible radially in relation to the rotational axis (24).

7. The harmonic drive according to claim 6, characterized in that the head (26) of each tappet (21) is laid out as a hollow body like a hollow cylindrical body section extending parallel to the axis, wherein side walls (27) of the head (26), which side walls expand peripherally from the shaft (22), are connected to one another on their face ends facing away from the rotational axis (24) by said curved wall (32), which forms a section of an elastically deformable external lateral surface (17) of the internal geared wheel (15).

8. A harmonic drive (12) having a drive core (14) of non-round cross-section rotating around its axis (24) for coaxial rolling with a surrounding, radially deformable sequence of curves in the shape of a wheel hoop which are connected to one another in an articulated way in a dimensionally stable bearing ring (11) of somewhat greater diameter, characterized in that an internal geared wheel (15) is assembled from individual, spoke-shaped, radially oriented tappets (21), whose tappet shafts (22) are equipped with feet (23), which are supported transverse to the axis (24) on an outside (25) of the drive core (14), with heads (26), which each have a curved wall (32), on the opposite side, and, approximately centrally between these elements, with connection profiles (30, 31), which project laterally in peripheral direction for mutual articulated connections of the tappets (21) to one another;

wherein the connection profiles (30, 31) are rings to receive a pivot pin.

9. The harmonic drive according to claim 8, characterized in that the connection profiles (30, 31) of said tappet (21) are a hole parallel to the axis on one side and said pin parallel to the axis on the other side to engage in such said hole.

10. The harmonic drive according to claim 8, wherein the connection profiles (30, 31) are implemented on two sides of each individual tappet (21), are disposed parallel to the rotational axis (24) and offset to one another, on the free face ends of peripheral projecting arms (28, 29), which peripheral projecting arms (28, 29) are short in relation to a radial length of the tappet (21), in a central region of the tappet (21).

11. An internal geared wheel (15) for a harmonic drive, having a drive core (14) of non-round cross-section rotating around its axis (24) for coaxial rolling with a surrounding, radially deformable sequence of curves in the shape of a wheel hoop which are connected to one another in an articulated way in a dimensionally stable bearing ring (11) of somewhat greater diameter, wherein the dimensionally stable bearing ring (11) has inner gear teeth,
wherein the internal geared wheel (15) is produced from neighboring individual tappets (21) which are connected to one another in an articulated way in the circular arc, whose respective shafts (22) are equipped with connection profiles (30, 31), which project laterally in the peripheral direction, approximately centrally between feet (23) of the connection profiles (30, 31) and heads (26) of the connection profiles (30, 31), for mutual articulated connections to one another and wherein the heads (26) are furnished with a sequence of outer gear teeth for engaging the inner gear teeth of the dimensionally stable bearing ring (11) and wherein the sequence of outer gear teeth is interrupted between neighboring heads (26).

12. A harmonic drive (12) comprising
a dimensionally stable bearing ring having inner gear teeth;
a radially deformable sequence of curves in the shape of a wheel hoop which are connected to one another in an articulated way in the dimensionally stable bearing ring (11) of somewhat greater diameter,
a drive core (14) of non-round cross-section, having an outside, rotating around a rotational axis (24) of the drive core (14) and surrounded by the radially deformable sequence of curves, for coaxial rolling with the surrounding, radially deformable sequence of curves;
an internal geared wheel (15) assembled from individual, spoke-shaped. radially oriented tappets (21), whose tappet shafts (22) are equipped with feet (23), which feet (23) are supported transverse to the rotational axis (24) on the outside (25) of the drive core (14), with heads (26), which heads (26) each have a curved wall (32), on an opposite side, and, approximately centrally between these heads (26), with connection profiles (30, 31), which project laterally in peripheral direction for mutual articulated connections of the tappets (21) to one another and wherein the heads (26) are furnished with a sequence of outer gear teeth for engaging the inner gear teeth of the dimensionally stable bearing ring (11) and wherein the sequence of outer gear teeth is interrupted between neighboring heads (26).

13. The harmonic drive according to claim 12, wherein the inner wheel (15) is produced from neighboring ones of the individual tappets (21), wherein the individual tappets (21) are connected to one another in an articulated way in the circular arc, wherein respective shafts (22) of the circular arc are equipped with connection profiles (30, 31), which connection profiles project laterally in a peripheral direction, approximately centrally between the feet (23) of the connection profiles and the heads (26) of the connection profiles, for mutual articulated connections of the connection profiles to one another.

14. A harmonic drive (12) comprising
a dimensionally stable bearing ring;
a radially deformable sequence of curves in the shape of a wheel hoop which are connected to one another in an articulated way in the dimensionally stable bearing ring (11) of somewhat greater diameter,
a drive core (14) of non-round cross-section, having an outside, rotating around a rotational axis (24) of the drive core (14) and surrounded by the radially deformable sequence of curves, for coaxial rolling with the surrounding, radially deformable sequence of curves;
an internal geared wheel (15) assembled from individual, spoke-shaped, radially oriented tappets (21), whose tappet shafts (22) are equipped with feet (23), which feet (23) are supported transverse to the rotational axis (24) on the outside (25) of the drive core (14), with heads (26), which heads (26) each have a curved wall (32), on an opposite side, and, approximately centrally between these heads (26), with connection profiles (30, 31), which project laterally in peripheral direction for mutual articulated connections of the tappets (21) to one another,
wherein a respective shaft (22) of the foot (23) facing the rotational axis (24) of the drive core (14) and of the internal geared wheel (15) is equipped on a second end with a peripherally expanding head (26) which is elastically compressible radially in relation to the rotational axis (24) wherein the connection profiles (30, 31) are formed as rings and receive a pivot pin.

15. The harmonic drive according to claim 14, wherein the head (26) of each tappet (21) is laid out as a hollow body like a hollow cylindrical body section extending parallel to the axis, whose side walls (27), which expand peripherally from the shaft (22), are connected to one another on their face ends facing away from the rotational axis (24) by a curved wall (32), which forms a section of the elastically deformable external lateral surface (17) of the internal geared wheel (15).

16. An internal geared wheel (15) for a harmonic drive comprising
a dimensionally stable bearing ring having inner gear teeth;
a radially deformable sequence of curves in the shape of a wheel hoop which are connected to one another in an articulated way in the dimensionally stable bearing ring (11) of somewhat greater diameter,
a drive core (14) of non-round cross-section rotating around a rotational axis (24) of the drive core (14) and surrounded by the radially deformable sequence of curves, for coaxial rolling with the surrounding, radially deformable sequence of curves;
wherein the drive core (14) is produced from neighboring individual tappets (21) which are connected to one another in an articulated way in a circular arc, wherein respective shafts (22) of the circular arc are equipped with connection profiles (30, 31), which connection profiles project laterally in a peripheral direction, approximately centrally between the feet (23) of the connection profiles (30, 31) and the heads (26) of the connection profiles (30, 31), for mutual articulated connections to one another and wherein the heads (26) are furnished with a sequence of outer gear teeth for engaging the inner gear teeth of the dimensionally stable bearing ring (11) and wherein the sequence of outer gear teeth is interrupted between neighboring heads (26).

17. A harmonic drive (12) comprising a dimensionally stable bearing ring;

a radially deformable sequence of curves in the shape of a wheel hoop which are connected to one another in an articulated way in the dimensionally stable bearing ring (11) of somewhat greater diameter, a drive core (14) of non-round cross-section, having an outside, rotating around a rotational axis (24) of the drive core (14) and surrounded by the radially deformable sequence of curves, for coaxial rolling with the surrounding, radially deformable sequence of curves;

an internal geared wheel (15) assembled from individual, spoke-shaped, radially oriented tappets (21), whose tappet shafts (22) are equipped with feet (23), which feet (23) are supported transverse to the rotational axis (24) on the outside (25) of the drive core (14), with heads (26), which heads (26) each have a curved wall (32), on an opposite side, and, approximately centrally between these heads (26), with connection profiles (30, 31), which project laterally in peripheral direction for mutual articulated connections of the tappets (21) to one another;

wherein the connection profiles (30, 31) are implemented on two sides of each individual tappet (21), are disposed parallel to the rotational axis (24) and offset to one another, on the free face ends of peripheral projecting arms (28, 29), which peripheral projecting arms (28, 29) are short in relation to a radial length of the tappet (21), in a central region of the tappet (21).

18. The harmonic drive according to claim 17, wherein the connection profiles (30, 31) of the tappet (21) are a hole parallel to the axis of the tappet (21) on one side and a pin parallel to the axis of the tappet (21) on the other side to engage in such a hole.

19. A harmonic drive (12) comprising a dimensionally stable bearing ring;

a radially deformable sequence of curves in the shape of a wheel hoop which are connected to one another in an articulated way in the dimensionally stable bearing ring (11) of somewhat greater diameter, a drive core (14) of non-round cross-section, having an outside, rotating around a rotational axis (24) of the drive core (14) and surrounded by the radially deformable sequence of curves, for coaxial rolling with the surrounding, radially deformable sequence of curves;

an internal geared wheel (15) assembled from individual, spoke-shaped radially oriented tappets (21), whose tappet shafts (22) are equipped with feet (23), which feet (23) are supported transverse to the rotational axis (24) on the outside (25) of the drive core (14), with heads (26), which heads (26) each have a curved wall (32), on an opposite side, and, approximately centrally between these heads (26), with connection profiles (30, 31), which project laterally in peripheral direction for mutual articulated connections of the tappets (21) to one another, wherein the connection profiles (30, 31) are formed as rings to receive a pivot pin.

* * * * *